No. 862,446. PATENTED AUG. 6, 1907.
M. J. CANNON.
ANIMAL TRAP.
APPLICATION FILED JAN. 3, 1906.

2 SHEETS—SHEET 1.

Witnesses.
Thomas J. Drummond
Walter R. Trott

Inventor.
Michael J. Cannon,
by Crosby & Gregory Attys.

THE NORRIS PETERS CO., WASHINGTON, D. C.

No. 862,446.
PATENTED AUG. 6, 1907.
M. J. CANNON.
ANIMAL TRAP.
APPLICATION FILED JAN. 3, 1906.
2 SHEETS—SHEET 2.
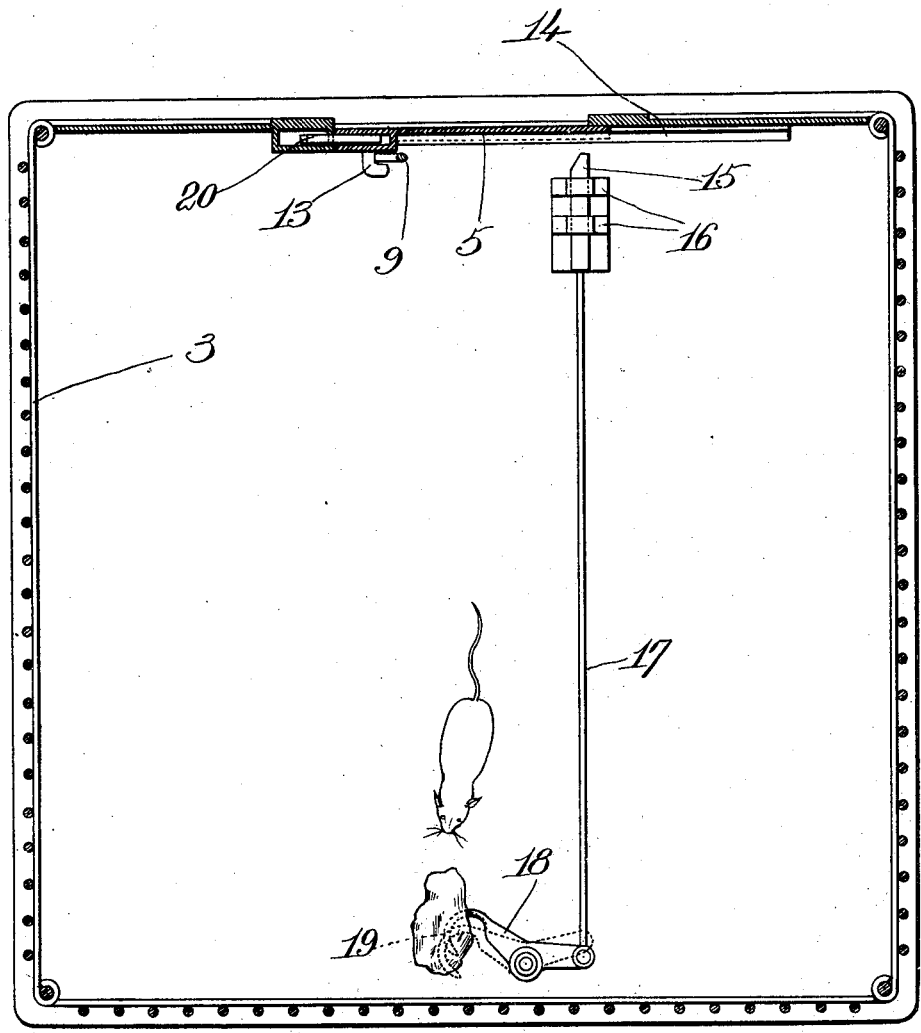
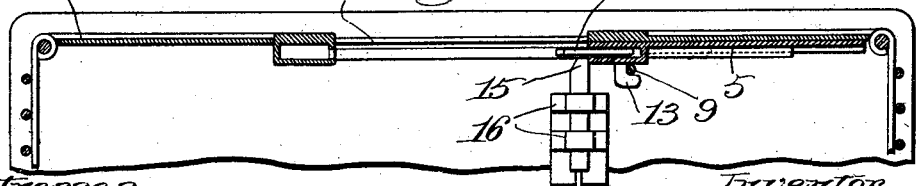

UNITED STATES PATENT OFFICE.

MICHAEL J. CANNON, OF BOSTON, MASSACHUSETTS.

ANIMAL-TRAP.

No. 862,446.      Specification of Letters Patent.      Patented Aug. 6, 1907.

Application filed January 3, 1906. Serial No. 294,484.

*To all whom it may concern:*

Be it known that I, MICHAEL J. CANNON, a citizen of the United States, and a resident of Boston, in the county of Suffolk and State of Massachusetts, have invented an Improvement in Animal-Traps, of which the following description, in connection with the accompanying drawings, is a specification, like letters on the drawings representing like parts.

This invention relates to animal traps, and has for its object to provide a novel trap by means of which an animal may be caught without injuring it in any way.

The trap comprises a cage having a door opening, a door to close said opening, a latch to hold the door open normally, a bait-holder connected with the latch so that when the animal begins to feed on the bait the latch releases the door and a spring or equivalent means to close the door automatically when it is released.

One embodiment of my invention will first be described and then the particular features thereof will be pointed out in the claims.

Figure 1:
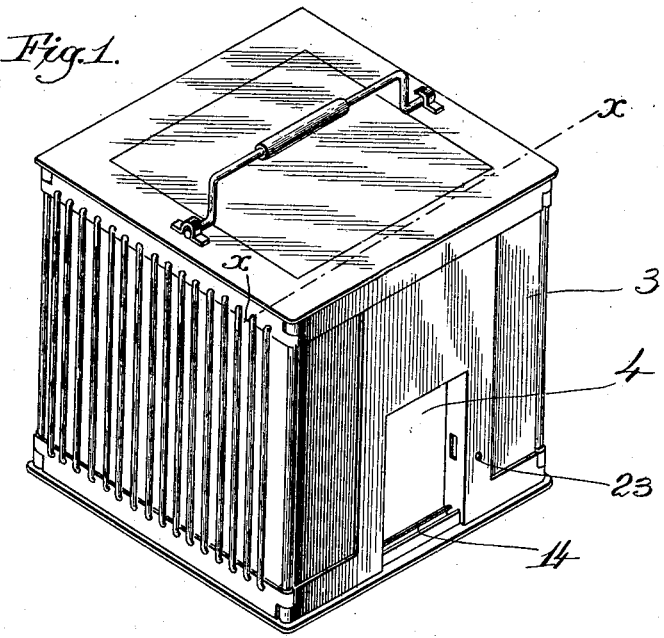
Figure 2:
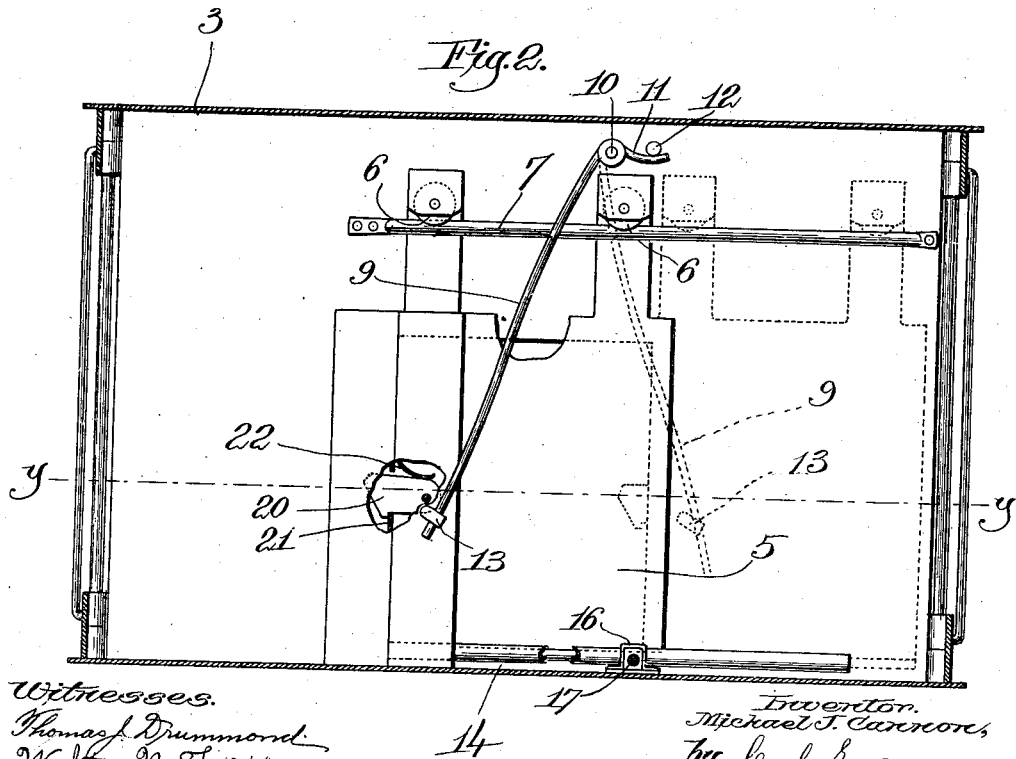

Figure 1 illustrates in perspective view a trap embodying my invention; Fig. 2 is a vertical section on substantially the line $x$—$x$, Fig. 1; Fig. 3 is a horizontal section on substantially the line $y$—$y$, Fig. 2; Fig. 4 is a detail showing the door held open by the latch.

The cage is designated generally by 3, and may be of any suitable construction and desired size according to the character of the animals to be caught. The sides may either be solid or more or less open. One side of the cage is provided with a door opening 4 which is adapted to be closed by a door 5. The door herein shown is a sliding door and is provided with rolls 6 which travel on a track 7.

9 indicates a spring which acts against the door and tends normally to close the same. In the present embodiment of my invention this spring is formed from a piece of spring-wire which is coiled about a pin or projection 10, and one end 11 of which engages a fixed projection 12 on the side of the cage, and the other arm of which engages a projection 13 extending from the inside of the door. The dotted line position, Fig. 2 shows the door open, and the full line position shows it closed.

The lower edge of the doorway runs in and is guided by a suitable track 14. The door is normally held open by a latch 15 which is slidably mounted in guides 16 secured to the floor of the trap, as shown in Figs. 3 and 4, and this latch is connected by a link 17 with a bait-holder 18 herein shown as a pivoted member having a hook 19 on which the bait is secured. When the door is opened the bait-holder occupies the position shown in Fig. 4. When the animal which has entered the trap begins to pull on the bait in an attempt to carry it out of the trap the bait-holder 18 is rocked, thereby withdrawing the latch 15 from the door and permitting the door to close under the influence of the spring 9. Said spring has sufficient tension to close the door almost instantly. When the door is closed it is automatically locked by a spring-controlled latch or lug 20 which engages a suitable keeper 21 and is held in engagement therewith by the spring 22. The lock 20 may be released by inserting a suitable implement through the hole 23 and disengaging it from the keeper 21. Since the door is mounted on rollers it will move very easily and will close with certainty.

By making the traps of different size they may be used either for catching small animals, such as mice or weasels or large animals such as wild tigers, lions, etc.

Having described my invention what I claim as new and desire to secure by Letters Patent is:—

1. An animal trap comprising a cage, a horizontally sliding door in one side of the cage, a horizontally sliding latch to engage the bottom of the door and hold it open, a bait-holder pivoted to the bottom of the cage and connected to the latch, and a spring to close the door when the latch is withdrawn therefrom.

2. An animal trap comprising a cage, a horizontally sliding door in one side of the cage, a horizontally sliding latch to engage the bottom of the door and hold it open, a pivoted bait-holder connected to the latch, a spring to close the door when the latch is withdrawn, and an automatic lock to hold the door closed.

In testimony whereof, I have signed my name to this specification, in the presence of two subscribing witnesses.

MICHAEL J. CANNON.

Witnesses:
   LOUIS C. SMITH,
   MARGARET A. DUNN.